(12) United States Patent
Faust et al.

(10) Patent No.: US 6,205,504 B1
(45) Date of Patent: Mar. 20, 2001

(54) EXTERNALLY PROVIDED CONTROL OF AN I²C BUS

(75) Inventors: Robert Allan Faust; John C. Kennel, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,126

(22) Filed: Sep. 30, 1998

(51) Int. Cl.⁷ .................................................. G06F 13/00
(52) U.S. Cl. .................. 710/126; 710/129; 710/101; 710/5
(58) Field of Search ................. 710/3–19, 101, 710/104–112, 126–131; 711/200; 713/601; 370/475

(56) References Cited

U.S. PATENT DOCUMENTS

| | | | |
|---|---|---|---|
| 5,613,157 | * 3/1997 | Davidson et al. | 710/8 |
| 5,764,968 | * 6/1998 | Ninomiya | 713/601 |
| 5,892,933 | * 4/1999 | Voltz | 710/131 |
| 5,897,663 | * 4/1999 | Stancil | 711/200 |
| 5,907,557 | * 5/1999 | Gandar | 370/475 |
| 5,913,045 | * 6/1999 | Gillespie et al. | 710/129 |
| 5,987,554 | * 11/1999 | Liu et al. | 710/129 |

OTHER PUBLICATIONS

"Channel Simulator", *IBM Technical Disclosure Bulletin*, vol. 26 No. 4, Sep. 1983, pp. 2125–2128.

"Philips Semiconductors; I2C–bus", available via the Internet at http://www–us.semiconductors.philips.com/i2c/facts, copy printed Jul. 30, 1998, pp. 1–4.

"The I²C–bus and how to use it (including specifications)", *Phillips Semiconductors*, Apr. 1995, pp. 1–24.

* cited by examiner

*Primary Examiner*—Christopher B. Shin
(74) *Attorney, Agent, or Firm*—Kelly K. Kordzik; Winstead Sechrest & Minick P.C.; Leslie A. Van Leeuwen

(57) ABSTRACT

A command string is sent from an operating system to a microcontroller coupled to one or more I²C buses. Such a command string may instruct the microcontroller to perform a read or write operation with respect to a bus device designated within the command string. The presence of the bus device may be new and the microcontroller unaware of such a presence. Data may be read from the main system to the particular bus device through the microcontroller, or data may be read from the bus device through the microcontroller back to the main system.

23 Claims, 5 Drawing Sheets

EXTERNALLY PROVIDED CONTROL OF AN I²C BUS

TECHNICAL FIELD

The present invention relates in general to data processing systems, and in particular, to an inter-IC (I²C) bus in a data processing system.

BACKGROUND INFORMATION

The I²C bus is a 2-wire bidirectional serial bus for communication between bus devices in a data processing system. Bus devices may include microprocessors, microcontrollers, memory devices, peripheral devices, data converters, and application-oriented circuits. Two wires of the I²C bus constitute a serial data line (SDA) for communicating data between bus devices and a serial clock line (SCL) carrying clock signals that control bus access and data transfer.

Each device is recognized by a unique address and can operate as either a receiver-only device or a transmitter with the capability to both receive and send information. Transmitters and/or receivers can operate in either master or slave mode, depending on whether the chip has to initiate a data transfer or is only addressed.

There are two limitations to devices that use I²C buses. First, once the bus devices have been interconnected with the I²C bus, this configuration is not expandable by the addition of new devices to the circuit, without having to reprogram any one or more of the devices that operate as a controlling device. For example, once the I²C bus circuitry has been connected, a microcontroller coupled to the bus and controlling will be programmed with the addresses of each of the existing devices. But, when a device is added at a later time, the microcontroller will not recognize this new device, since it will not know the new device's address. The crude solution to this problem is to also replace the microcontroller with a newly programmed microcontroller having knowledge of the new bus device.

The second limitation is related to the first, in that once the devices have been interconnected by the I²C bus, the set of operations, or commands, possible between the devices over the I²C bus is also set and cannot be expanded without also replacing the microcontroller.

Therefore, there is a need in the art to be able to add new devices and/or to add new functionality to an existing I²C bus arrangement without also having to replace the microcontroller.

SUMMARY OF THE INVENTION

The present invention addresses the foregoing needs by providing programming within the microcontroller coupled to an I²C bus and an interface to an external control for externally providing signals for controlling commands performed by the microcontroller over the I²C bus.

In an embodiment of the present invention, an operating system external to the microcontroller sends messages to the microcontroller instructing the microcontroller to perform specified actions, such as, the read or write access of a particular bus device coupled to the microcontroller over the I²C bus.

In another embodiment of the present invention, the control signals from the operating system can instruct the microcontroller to address a new bus device of which the microcontroller was not previously programmed to recognize.

An advantage of the present invention is an ability for a host system to command and interrogate all devices attached to a microcontroller over an I²C bus in ways not envisioned when the microcontroller program was originally written.

Another advantage of the present invention is that the host system can command and interrogate new devices added to existing I²C channels, wherein the microcontroller coupled to the I²C channels was not programmed to recognize such new devices.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

The present invention pertains to I²C bus applications. For further support, please refer to the I²C Bus Specification, published by Philip Semiconductors and available at the Philips Semiconductors' home page, http://www-us.semiconductors.philips.com/i2c/facts/. The I²C Bus Specification is hereby incorporated by reference herein.

Figure 1:
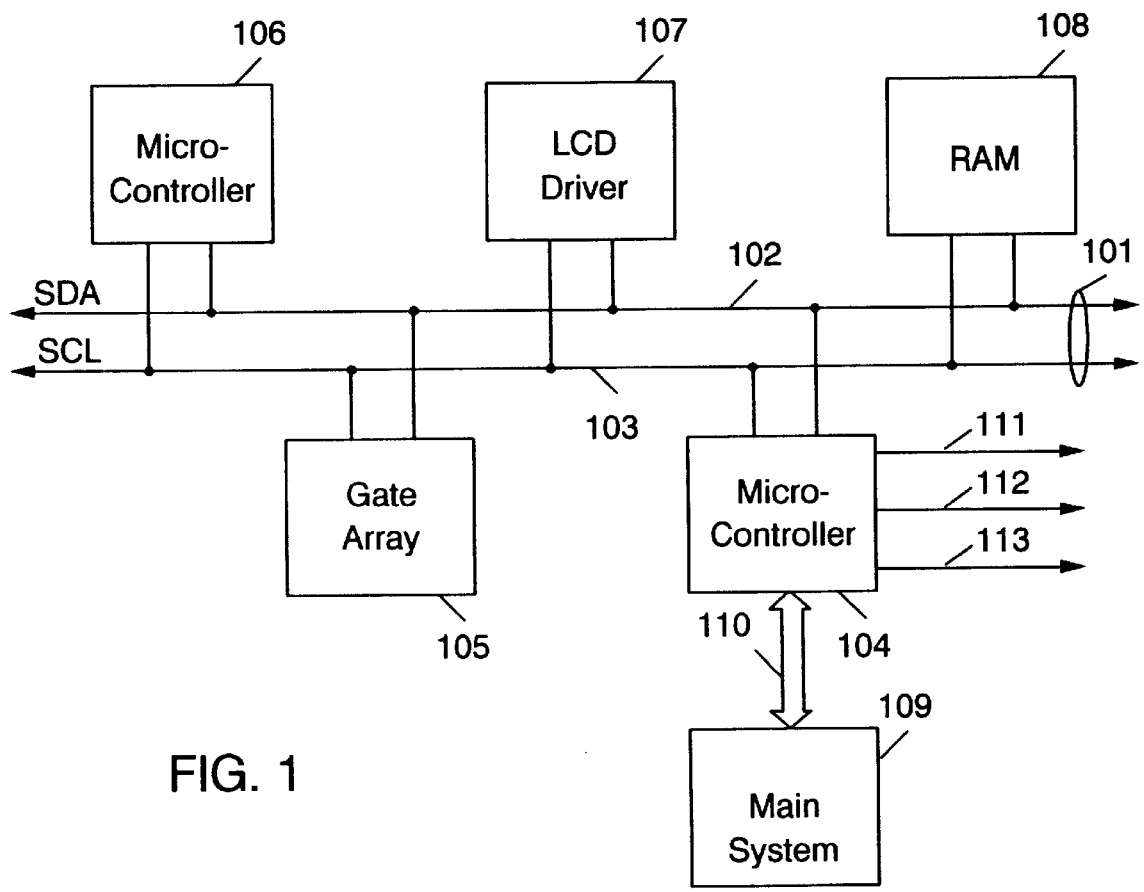
FIG. 1 illustrates an I²C bus coupling various bus devices in a manner in accordance with the present invention.

Referring to FIG. 1, there is illustrated a plurality of bus devices 104–108 each coupled to an I²C bus 101, specifically, the SDA line 102 and the SCL line 103, in accordance with the I²C Bus Specification. Bus device 104 is a first microcontroller, bus device 105 is a gate array, bus device 106 is a second microcontroller, bus device 107 is an LCD driver, and bus device 108 is a random access memory (RAM) device. However, the present invention should not be limited to these selected bus devices, but is applicable to any devices operable with an I²C bus.

Microcontroller 104 is designated as the bus device operable for using I²C channels to command and interrogate various bus devices, such as, bus devices 105–108 coupled to I²C bus 101. Microcontroller 104 is also coupled to and may interrogate devices on other I²C buses 111–113. Hereinafter, buses 101 and 111–113 may be referred to as I²C channels, which are coupled to ports in microcontroller 104. For the sake of simplicity, bus devices coupled to each of buses 111–113 are not shown, but it should be understood that a number of such bus devices may be coupled to each of the buses 111–113 in a manner similar to bus devices 105–108 coupled to I²C bus 101.

Microcontroller 104 is coupled to main system 109 by a bidirectional communications bus 110. Main system 109 may be any data processing system, such as system 513 subsequently discussed with respect to FIG. 5. Main system 109 will have a resident operating system permitting system 109, and a user of system 109, to communicate with microcontroller 104 in a manner specified hereinafter.

Figure 2:
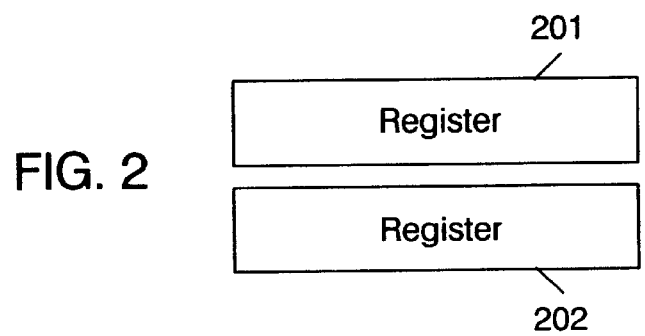
FIG. 2 illustrates registers implemented within a microcontroller coupled to an I²C bus for communicating with an external system.

Referring to FIG. 2, there is illustrated data register 201 and status register 202, which are implemented in circuitry that is part of bus 110. Register 201 is operable for receiving or transmitting data one byte at a time over bus 110. Register 202 is operable for presenting status which facilitates the use of the data register 201 to transmit or receive as follows: if system 109 writes a byte into data register 201, a bit in register 202 is set which interrupts microcontroller 104. Microcontroller 104 responds to the interrupt and reads the byte in register 201. This causes the interrupting bit in status register 202 to be reset, thus informing system 109 that it is safe to write another byte. In this manner, the flow of data is interlocked to prevent the transmitting speed from exceeding the receiver's ability to read. In the same manner, microcontroller 104 can write a byte into register 201 and a different bit is set in the status register which interrupts system 109. When system 109 responds to the interrupt and reads the data in register 201, the system's interrupting bit is reset. This interlocked, bidirectional communication facility is also referred to as a mailbox system.

The I²C bus specification includes microcode for implementing communications between microcontroller 104 and other bus devices on any one or more of a plurality of I²C channels coupled to microcontroller 104. Such messages may include a read operation whereby data is read from one of the bus devices to the microcontroller 104, or a write operation whereby data is read from the microcontroller 104 to one of the other bus devices 105–108. Again, references to bus devices communicating with microcontroller 104 will also include bus devices coupled to any one or more of channels 111–113.

The problem with a device that uses I²C buses, such as microcontroller 104, using I²C channels 101 and 111–113 to command and interrogate devices, it can only perform actions on the channels that were written into the microcontroller's 104 program when the program was developed. If any new functions or devices are desired and the microcontroller's program is internal (not in an external RAM), then the microcontroller 104 must be removed and replaced with one containing a new program. As can be appreciated, this is expensive and inconvenient, especially for the end user.

The microcontroller 104 of the present invention is programmed to recognize and implement a request from a host system 109 to perform any I²C command. This permits the host system 109 to perform I²C operations on the microcontroller's 104 channels 101 and 105–113 that were not envisioned when the microcontroller's 104 program was developed. It also provides a means to command and interrogate new devices that are added to any one of channels 101 and 105–113 of which the microcontroller 104 was not originally programmed to recognize.

Note, the implied solution of providing an external RAM for updating the internal programs of microcontrollers is still an unacceptable solution because it requires more parts and such external RAMS may not be easy to replace or reprogram.

Figure 3:
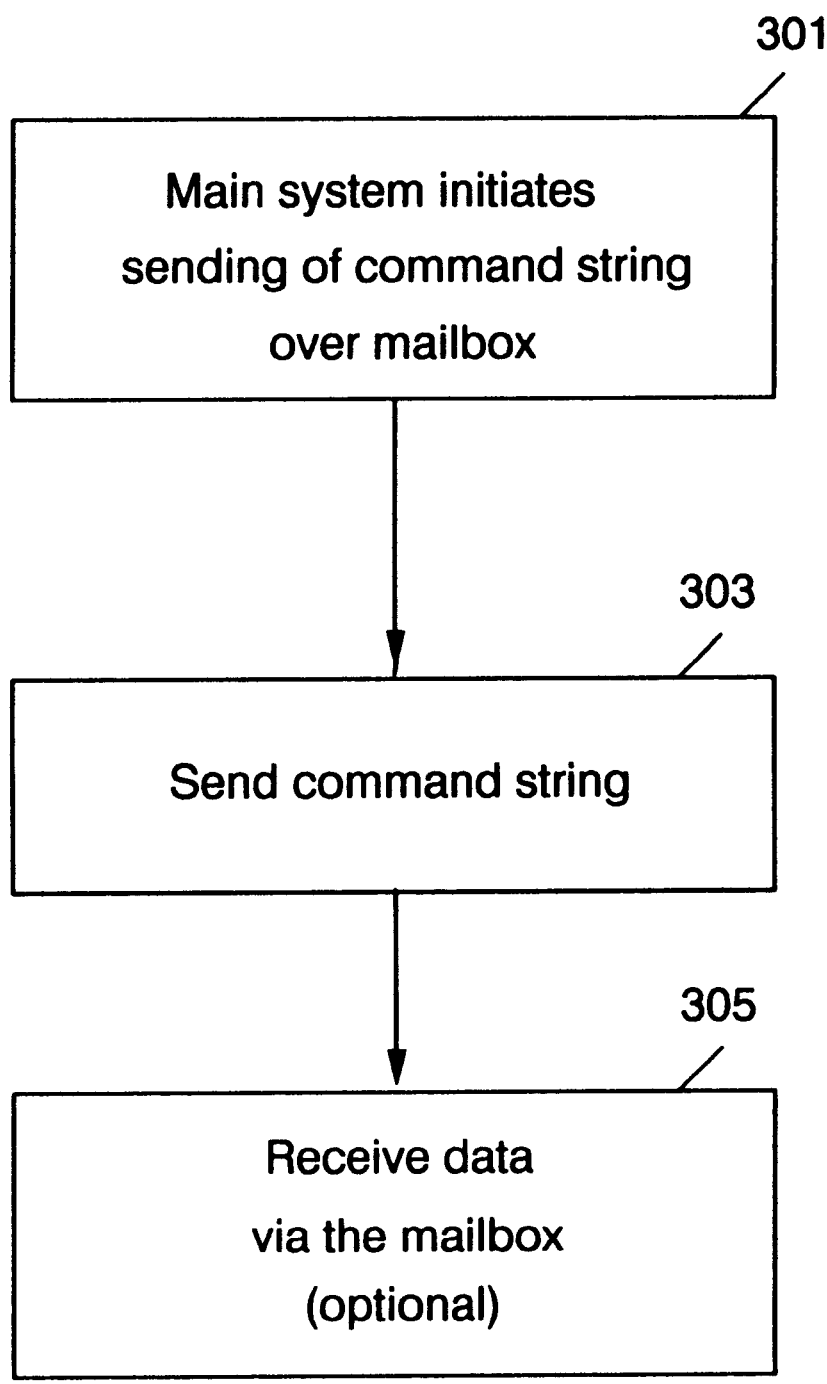
FIG. 3 illustrates a flow diagram of a process for sending a command string to a microcontroller from an external system.

Referring next to FIG. 3, there is illustrated a process for initiating and sending a command string (a message) from host system 109 to microcontroller 104 to perform a command by microcontroller 104 over one of the channels 101, 105–113. In step 301, the main system 109 initiates the sending of a command string over the mailbox system in bus 110, which may be in response to a program running within system 109, or a user-initiated program. In step 303, command string is sent to microcontroller 104 over bus 110.

Step 305 is an optional step, which is the retrieval and receipt of data from microcontroller 104, and specifically data register 201. Such data may have been placed there by the program running within microcontroller 104. For example, the command string sent in step 303 may have instructed microcontroller 104 to retrieve a particular set of data from RAM 108. Such data would have been retrieved by microcontroller 104 and stored within data register 201 for retrieval by system 109 in step 305. Step 305, may include a similar process as implemented with step 303, in that an interrupt signal is generated by microcontroller 104 in register 202 informing main system 109 when data is stored within data register 201 by microcontroller 104.

Figure 4A:
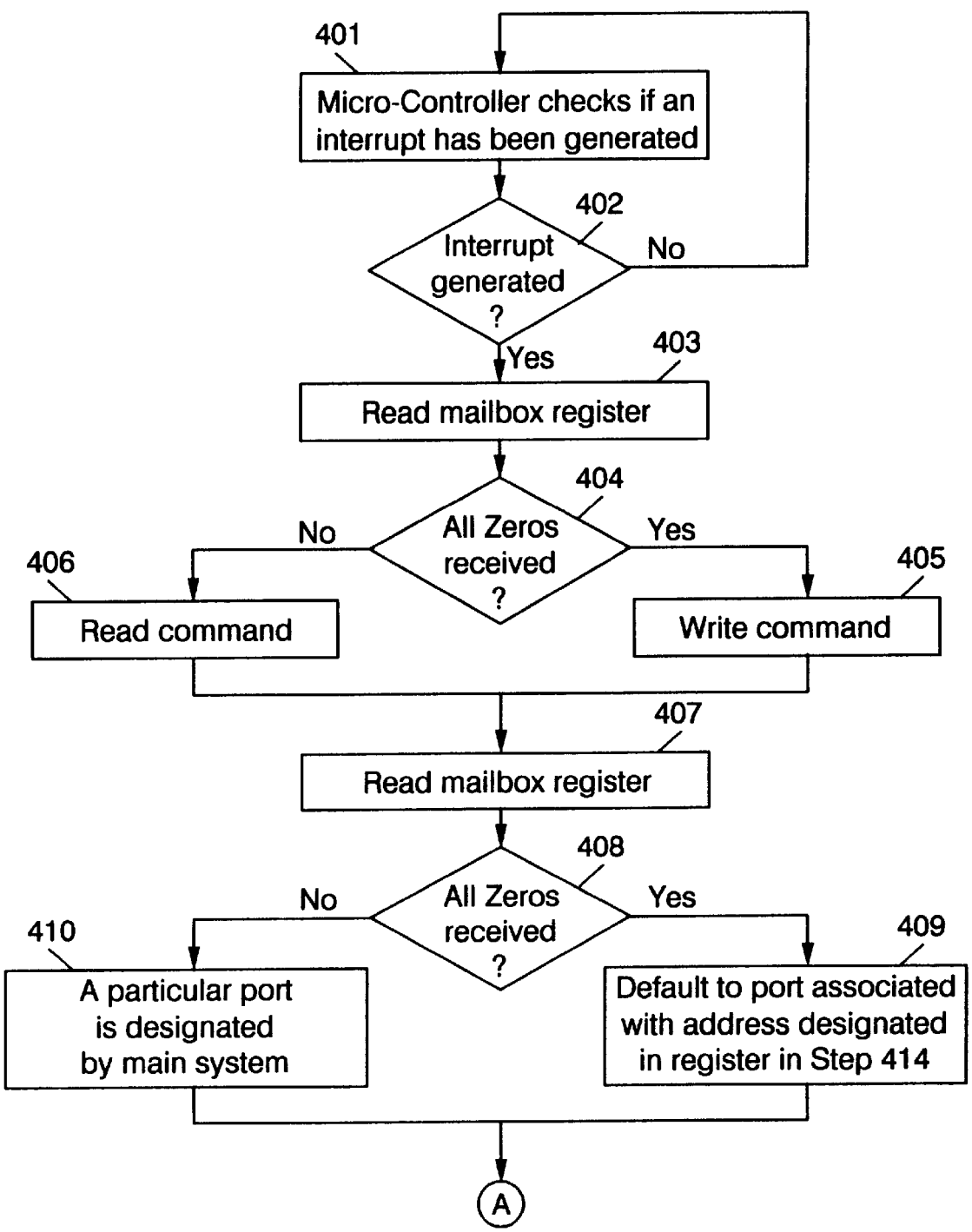
FIGS. 4A–4B illustrate a flow diagram of a process implemented in accordance with the present invention.
Figure 4B:
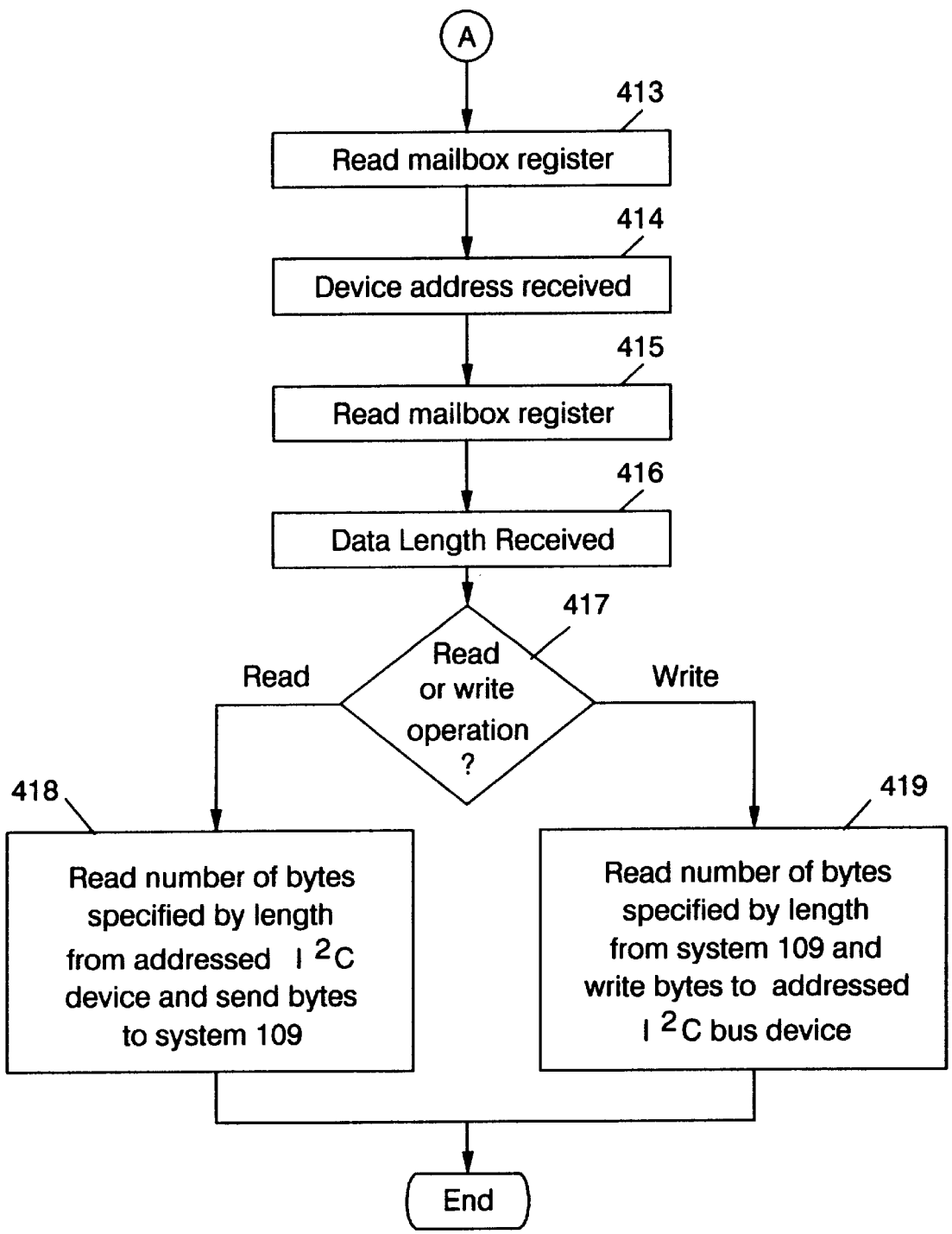

Referring next to FIGS. 4A–4B, in step 401, on a periodic basis, microcontroller 104 will check to determine if the interrupt signal has been generated by data sent from the main system 109. In step 402, if an interrupt has not been generated, then the process loops back to step 401. However, if the interrupt signal is generated in step 402, the process proceeds to step 403, whereby microcontroller 104 reads the mailbox data register 201. In step 404, a determination is made whether the byte contained within register 201 consists of all zeros (all negated bits). If all zeros are contained within register 201, then this instructs microcontroller 104 that a write command is to be performed by microcontroller 104 (step 405). If something other than all zeros is received, then in step 406, this instructs microcontroller 104 to perform a read operation.

The process then proceeds to step 407, whereby microcontroller 104 receives the next byte sent by system 109 into register 201. Note, the commands string sent by system 109 (step 303) will consist of a series of bytes in a manner which will be apparent from the remaining discussion.

In step 408, a determination is made whether the byte read in step 407 consists of all zeros. If yes, then in step 409, this instructs microcontroller 104 that the command to be performed (see steps 418 and 419) will be sent through the port associated with the address designated in the byte stored within receipt register 201 and read in step 414, as discussed below. In other words, the address provided in step 414 will be an address of a bus device on which the command will be performed, and this address will determine which port (i.e., which channel 101, 111, 112, or 113) through which the command will travel. This device address/port association is predetermined and can be implemented with some type of table look-up mechanism or other equivalent means.

If the byte read in step 407 does not contain all zeros, then in step 410, the microcontroller 104 is instructed to perform the command via the port designated by the byte read in step 407. Step 410 permits system 109 to designate which port the command should pass. This allows a user to designate a particular port and a particular device coupled to this port for operation of the command.

Thereafter, in step 413, microcontroller 104 will again read the next byte received from system 109 into register 201. In step 414, this byte will designate the address of the device on which the command will be performed.

Thereafter, in step 415, register 201 is again read by microcontroller 104. In step 416, the information read in step 415 is the length of data to either be read from an I²C bus device or to be written into an addressed I²C bus device. In step 417, the process will proceed to either step 418 or step 419 as a function of whether a read command (step 406) or a write command (step 405) has been previously specified. If a read command (step 406) has been previously specified, then the process proceeds to step 418 to read a number bytes, specified by the length received in step 416, from the addressed I²C bus device, and then these bytes are retrieved to register 201 to be sent to system 109. If a write operation has been specified (step 405), then the process proceeds to step 419 to read the specified number of bytes from system 109 via register 201, and to write these bytes to the addressed I²C bus device.

Figure 5:
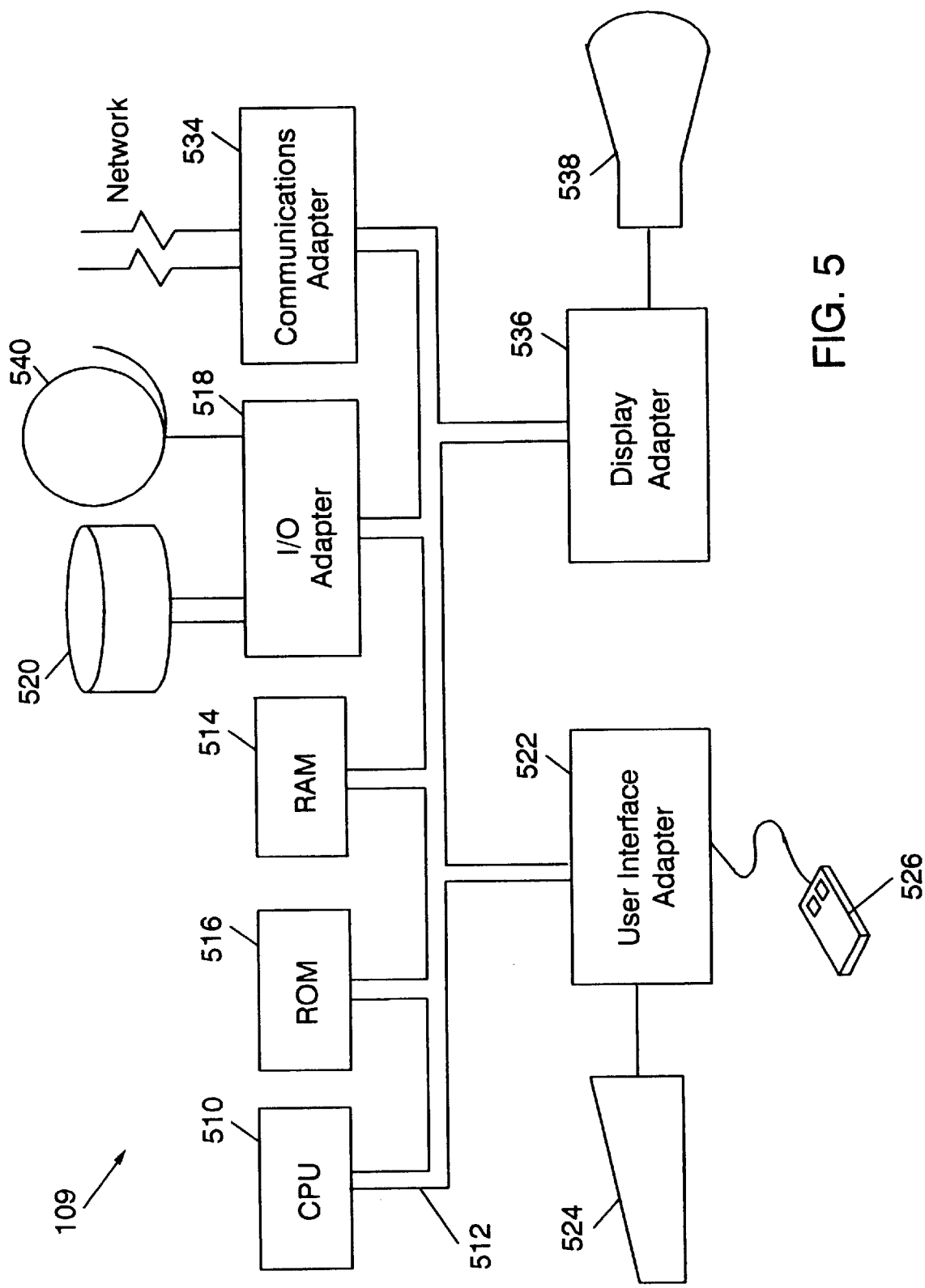
FIG. 5 illustrates a data processing system configured in accordance with the present invention.

Referring next to FIG. 5, there is illustrated an embodiment of main system 109, which illustrates a typical hardware configuration of a workstation in accordance with the subject invention having central processing unit (CPU) 510, such as a conventional microprocessor, and a number of other units interconnected via system bus 512. System 109 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, and/or other user interface devices such as a touch screen device (not shown) to bus 512, communication adapter 534 for connecting system 109 to a data processing network, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. CPU 510 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. An information handling system comprising:
a microcontroller coupled to a bus device via an I²C bus and having a predetermined set of capabilities for communicating with the bus over the I²C bus;
an external device coupled to the microcontroller via a bus, wherein the external device is not coupled to the I²C bus;
circuitry operable for sending a first byte of a command string from the external device over the bus to a register in the microcontroller;
circuitry operable for reading the first byte, wherein the first byte designates whether a read or write operation is to be performed between the microcontroller and the bus device;
circuitry operable for sending a second byte of the command string from the external device over the bus to the register in the microcontroller;
circuitry operable for reading the second byte, wherein the second byte designates an address of the bus device;
circuitry operable for sending a third byte of the command string from the external device over the bus to the register in the microcontroller;
circuitry operable for reading the third byte, wherein the third byte informs the microcontroller of a length of data to be sent from the external device to microcontroller;
circuitry operable for transferring the data from the external device to the register; and
circuitry operable for reading the data from the register, wherein if the operation is a write operation then the data is written from the microcontroller to the addressed bus device.

2. The system as recited in claim 1, wherein if the operation is a read operation, then the system further comprises:
circuitry operable for reading the data from the addressed bus device to the register in the microcontroller; and
circuitry operable for transferring the data from the register to the external device.

3. The microcontroller as recited in claim 1, wherein the microcontroller was previously unaware of an address of the bus device.

4. An information handling system comprising:
a microcontroller coupled to a bus device via an I²C bus and having a predetermined set of capabilities for communicating with the bus over the I²C bus;
an external device coupled to the microcontroller via a bus, wherein the external device is not coupled to the I²C bus;
circuitry operable for sending a first byte of a command string from the external device over the bus to a register in the microcontroller;
circuitry operable for reading the first byte, wherein the first byte designates whether a read or write operation is to be performed between the microcontroller and the bus device;
circuitry operable for sending a second byte of the command string from the external device over the bus to the register in the microcontroller; and
circuitry operable for reading the second byte, wherein the second byte designates an address of the bus device;
wherein the read or write operation was not part of the predetermined set of capabilities.

5. A microcontroller comprising:
a port adaptable for coupling to an I²C bus;
a register operable for receiving a command from an external device not coupled to the I²C bus; and
circuitry operable for performing the command which instructs the microcontroller to perform an operation between the microcontroller and a bus device coupled to the I²C bus;
wherein the command performs an operation between the microcontroller and the bus device, and wherein, previous to receiving the command from the external device, the microcontroller was not aware of an address of the bus device.

6. A microcontroller comprising:
a port adaptable for coupling to an I²C bus;
a register operable for receiving a command from an external device not coupled to the I²C bus; and
circuitry operable for performing the command which instructs the microcontroller to perform an operation between the microcontroller and a bus device coupled to the I²C bus;
wherein the microcontroller was not programmed to perform the command previous to receiving the command from the external device.

7. The microcontroller as recited in claim 6, wherein the external device is a data processing system coupled to the register via a bus.

8. The microcontroller as recited in claim 6, wherein the register is operable for transferring data from the microcontroller to the data processing system.

9. The microcontroller as recited in claim 6, wherein the operation is a read of data from the bus device to the microcontroller.

10. The microcontroller as recited in claim 6, wherein the operation is a write of data from the microcontroller to the bus device.

11. The microcontroller as recited in claim 6, wherein the command designates an address of the bus device.

12. The microcontroller as recited in claim 6, wherein the command designates a port by which the bus device is coupled to the microcontroller.

13. In an information handling system, a method comprising the steps of:
   receiving a command by a first device coupled to a second device by a first I²C bus, wherein the command is sent by a data processing system not coupled to the first I²C bus; and
   performing the command by the first device, wherein the command performs an operation between the first and second devices, and wherein, previous to receiving the command from the data processing system, the first device is unaware of a presence of the second device and its address.

14. In an information handling system, a method comprising the steps of:
   receiving a command by a first device coupled to a second device by a first I²C bus, wherein the command is sent by a data processing system not coupled to the first I²C bus; and
   performing the command by the first device, wherein the first device was not programmed to perform the command previous to receiving the command from the data processing system.

15. The method as recited in claim 14, wherein the first device is a microcontroller.

16. The method as recited in claim 14, wherein the first device was not able to perform the command previous to receiving the command from the data processing system.

17. The method as recited in claim 14, wherein the command instructs the first device to perform an operation between the first and second devices.

18. The method as recited in claim 17, wherein the operation is a read of data from the second device to the first device.

19. The method as recited in claim 17, wherein the operation is a write of data from the first device to the second device.

20. The method as recited in claim 17, wherein the command designates an address of the second device.

21. The method as recited in claim 20, wherein the command designates a port by which the second device is coupled to the first device.

22. The method as recited in claim 19, wherein the command sends the data from the data processing system to the first device.

23. The method as recited in claim 18, further comprising the step of transferring the data from the first device to the data processing system.

\* \* \* \* \*